(12) United States Patent
Lin et al.

(10) Patent No.: US 8,636,907 B1
(45) Date of Patent: Jan. 28, 2014

(54) SEALED MAGNETIC FILTER FOR HAZARDOUS OPERATIONS AND EASY CLEAN SERVICE

(71) Applicants: AMT International, Inc., Plano, TX (US); CPC Corporation, Taiwan, Taipei (TW)

(72) Inventors: Tzong-Bin Lin, Chia-Yi (TW);
Fu-Ming Lee, Katy, TX (US);
Ming-Hsung Liu, Chia-Yi (TW);
Cheng-Tsung Hong, Chia-Yi (TW);
Yung-Sheng Ho, Chia-Yi (TW);
Kuang-Yeu Wu, Plano, TX (US)

(73) Assignees: AMT International, Inc., Plano, TX (US); CPC Corporation, Taiwan, Taipei (TW)

( * ) Notice: Subject to any disclaimer, the term of this patent is extended or adjusted under 35 U.S.C. 154(b) by 0 days.

(21) Appl. No.: 13/890,602

(22) Filed: May 9, 2013

(51) Int. Cl.
*B03C 1/32* (2006.01)
*B01D 35/06* (2006.01)

(52) U.S. Cl.
USPC ............... 210/695; 210/222; 210/223

(58) Field of Classification Search
USPC .......................... 210/695, 222, 223
See application file for complete search history.

(56) References Cited

U.S. PATENT DOCUMENTS

| | | | |
|---|---|---|---|
| 2,789,655 | A | 4/1957 | Michael et al. |
| 3,139,403 | A | 6/1964 | Cramer et al. |
| 4,946,589 | A | 8/1990 | Hayes |
| 5,043,063 | A | 8/1991 | Latimer |
| 5,427,249 | A | 6/1995 | Schaaf |
| 5,819,949 | A | 10/1998 | Schaaf et al. |
| 6,077,333 | A | 6/2000 | Wolfs |
| 6,730,217 | B2 | 5/2004 | Schaaf et al. |
| 7,597,015 | B2 | 10/2009 | Harley |
| 2012/0165551 | A1 | 6/2012 | Yen et al. |
| 2012/0228231 | A1 | 9/2012 | Yen et al. |

FOREIGN PATENT DOCUMENTS

GB 850233 10/1956

*Primary Examiner* — David A Reifsnyder
(74) *Attorney, Agent, or Firm* — Cascio & Zervas

(57) ABSTRACT

A two-stage sealed magnetic filter continuously removes magnetic and non-magnetic contaminants from liquid process streams. Elongated non-magnetic holder sleeves encasing magnet bars attract magnetic contaminants while a screen cylinder captures non-magnetic contaminants. The magnet bars are accessible without having to open the interior of the housing to the environment. Thus, during maintenance, removing the magnet bars from the holder sleeves releases the magnetic contaminants that have adhered to the holder sleeves into the screen cylinder which partially encloses the holder sleeves. Contaminants are flushed out of the magnetic filter without exposing workers to potentially hazardous substances. Polymeric sludge occluded with iron compounds can be effectively removed from streams in refineries and chemical plants. The iron compounds are formed from carbon steel which is prevalent in plant machinery and that corrodes in the presence of acidic contaminants.

20 Claims, 3 Drawing Sheets

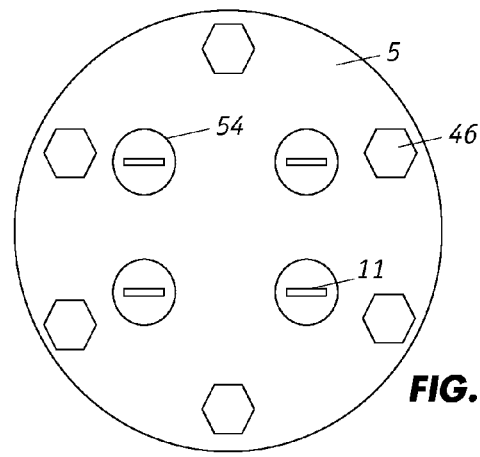
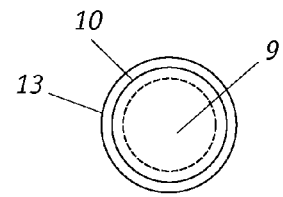
FIG. 2D
FIG. 2B
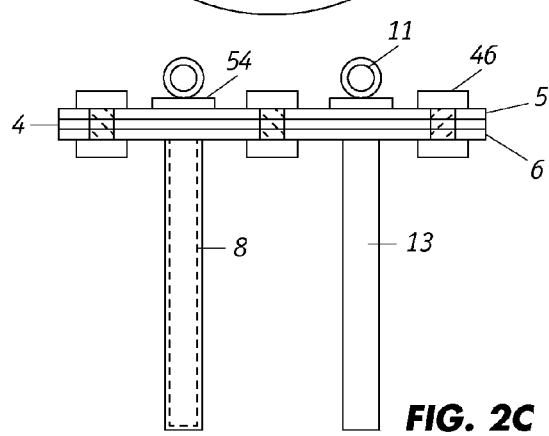
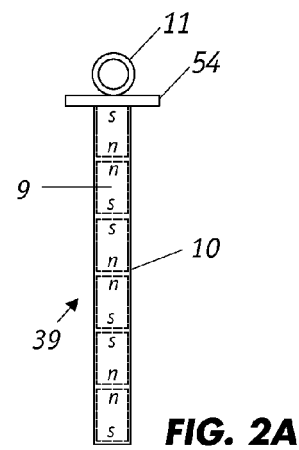
FIG. 2C
FIG. 2A
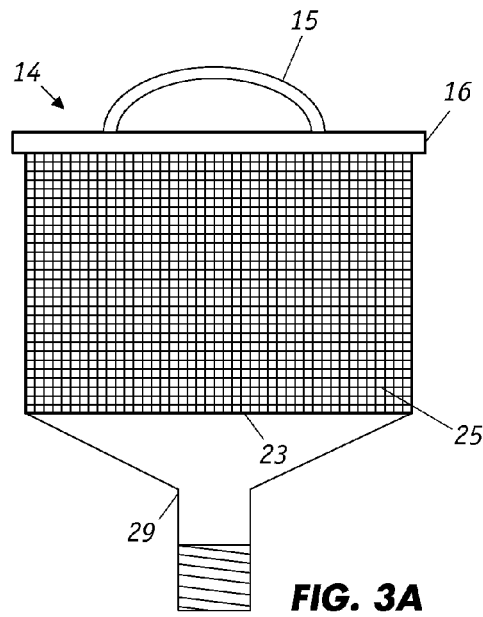
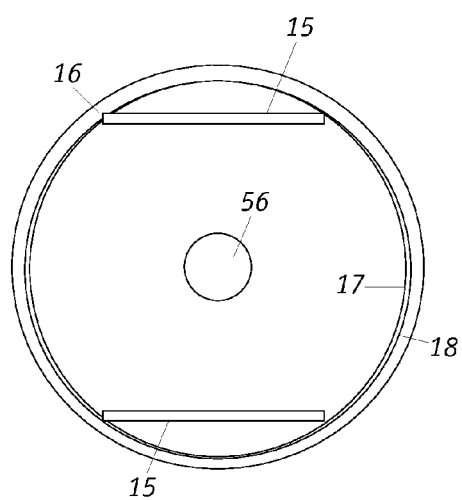
FIG. 3A
FIG. 3B

SEALED MAGNETIC FILTER FOR HAZARDOUS OPERATIONS AND EASY CLEAN SERVICE

FIELD OF THE INVENTION

The present invention generally relates to techniques for removing contaminants from liquid process streams in refinery and chemical plants with a magnetic filter and particularly to employing and servicing a sealed magnetic filter that is designed so that, during clean-up service, contaminant particles are readily flushed therefrom without exposing the interior of the magnetic filter housing to the environment.

BACKGROUND OF THE INVENTION

Magnets have been used to remove ferromagnetic materials such as iron-containing particles fem fluid streams. The magnets are typically enclosed in filter devices that are incorporated online with the process streams. For large scale commercial applications, by employing alternate magnetic filters in parallel, with one operating while the other unit is being serviced, continuous operations with minimum downtime can be attained. Current magnetic filter designs usually require that the housing be dismantled using heavy machinery in order to access and remove the magnetic bars and thereafter clean off the contaminants. Aside from the inconvenience, this routine subjects operators to potential hazardous and/or flammable substances that may be present in the process fluids and contaminants. It also unnecessarily exposes air-sensitive process fluids to the environment.

SUMMARY OF THE INVENTION

The invention provides a magnetic filter that is particularly suited for removing degradation sludge, iron containing particles or flakes, as well as non-magnetic polymeric materials from the process streams in refinery and chemical plants.

In one aspect, the invention is directed to a magnetic filter for separating magnetic and non-magnetic contaminants from a contaminated liquid process stream in a refinery or a chemical plant that includes:

a housing having (i) an upper opening that is sealed with a detachable cover plate (ii) a process stream inlet (iii) a process stream outlet (iv) an interior region between the inlet and outlet and (v) a lower end, wherein the cover plate supports a plurality of vertically oriented, elongated non-magnetic holder sleeves with each holder sleeve being configured to accommodate one or more magnets that are disposed therein; and a screen cylinder that is positioned in the interior region wherein the screen cylinder has (i) a rim defining an opening through which the plurality of holder sleeves are disposed and (ii) a filter screen that encloses lower portions of the plurality of holder sleeves wherein the filter screen is configured to capture contaminants thereon wherein the rim and cover plate define a flow channel that directs the contaminated liquid process stream from the inlet through the opening of the rim, pass the holder sleeves so that magnetic contaminants adhere to the exterior of the holder sleeves and through the filter screen where non-magnetic contaminants of the desired size are removed to form a treated process stream that leaves via the outlet and wherein the one or more magnets that are disposed in each holder sleeve can be removed from the holder sleeve without having, to open the cover plate and exposing the interior region to the environment.

The simple design of the magnetic filter affords easy clean-up service whereby workers can manually remove the magnetic bars from the holder sleeves to thereby release magnetic contaminants without the risk of being exposed to hazardous chemicals inside the magnetic filter. No mechanical or power lifting tool is required. The contaminants which include polymeric sludge are then removed by flushing the interior of the magnetic filter. Clean-up service of the magnetic filter can be implemented through an automatic sequencing device.

In another aspect, the invention is directed to a method of removing magnetic and non-magnetic particles from a contaminated liquid process stream in a refinery or chemical plant that includes the steps of:

(a) providing, a magnetic filter device that comprises:

a housing having (i) an upper opening that is sealed with a detachable cover plate (ii) a process stream inlet (iii) a process stream outlet (iv) an interior region between the inlet and outlet and (v) a lower end, wherein the cover plate supports a plurality of vertically oriented, elongated non-magnetic holder sleeves with each holder sleeve being configured to accommodate one or more magnets that are disposed therein; and a screen cylinder that is positioned in the interior region wherein the screen cylinder has (i) a rim defining an opening through which the plurality of holder sleeves are placed and (ii) a filter screen that encloses lower portions of the plurality of holder sleeves wherein, the filter screen is configured to capture contaminants thereon wherein the rim and cover plate define a flow channel that directs the contaminated liquid process stream from the inlet through the opening of the screen cylinder, pass the holder sleeves and through the filter screen;

(b) connecting the contaminated liquid process stream to the inlet of the magnetic filter, such that as the contaminated liquid process stream initially flows pass the holder sleeves, magnetic contaminants adhere to the exterior of the holder sleeves and subsequently as the contaminated liquid process stream continues pass the filter screen non-magnetic contaminants of the desired size are removed by the filter screen to thereby form a treated process stream that exits through the outlet;

(c) terminating the flow of the contaminated liquid process stream into the inlet;

(d) withdrawing magnets from one or more of the holder sleeves, without having to open the cover plate and expose the interior region to the environment, to thereby release magnetic contaminants that have adhered to the exterior surface of the holder sleeves;

(e) flushing out magnetic and non-magnetic contaminants from the screen cylinder; and (f) placing magnets back into one or more of the holder sleeves.

BRIEF DESCRIPTION OF THE DRAWINGS

FIG. 2A is a cross sectional of the magnet bar assembly;

FIG. 2B is a top view of the magnetic bar and holder sleeve assembly;

FIGS. 2C and 2D are side and top views, respectively, of the holder sleeve assembly;

FIGS. 3A and 3B are side and top views, respectively, of the screen cylinder;

DETAILED DESCRIPTION OF THE PREFERRED EMBODIMENTS

Figure 1:
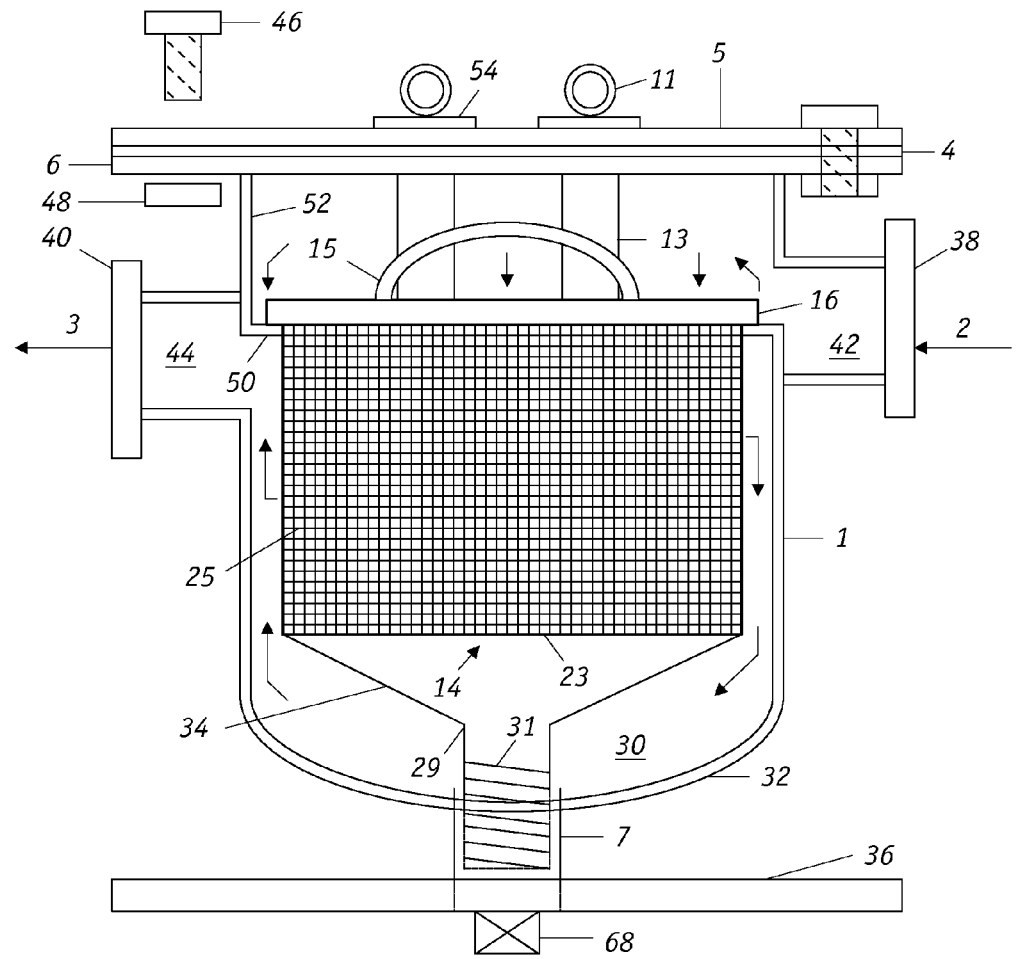
FIG. 1 is a cross sectional view of an embodiment of the magnetic filter.

As shown in FIG. 1, the magnetic filter comprises a housing 1 having an inlet, pipe section 38 that can be coupled to a contaminated process stream 2 and an outlet pipe section 40 from which treated process stream 3 exits. The housing 1 defines an interior region 30 which accommodates a screen cylinder 14 that has an upper rim 16, a middle, vertical filtering section 25 that is preferably constructed of multiple metal screens having different mesh sizes, and a lower cone-shaped non-filtering section 34 that has an open tube or pipe 29 at the end. Threads 31 on its exterior allows tube 29 to be screwed onto a female threaded drain pipe 7, which is welded onto support platform 36. Valve 68, which is normally closed during filtration, is opened during cleanup service to allow flush fluid to be discharged from the interior of screen cylinder 14. Rim 16, which preferably has a diameter that is larger than that of screen section 25, is placed freely on a supporting ring 50 that is affixed to an inner wall of housing 1. In positioning, cylinder screen 14, tube 29 is screwed into drain pipe 7 until the top rim 16 fully engages supporting ring 50 to form a tight seal.

After the screen cylinder is secured, cover plate 5, which is equipped with a plurality of vertically oriented elongated holder sleeves 13, is fastened to an annular flange 6 that is welded to the outer perimeter along the opening in housing 1. A polymer gasket 4 is positioned between cover plate 5 and flange 6 so as to form a tight seal as nuts 48 are threaded into bolts 46. Holder sleeves 13 are preferably welded to top cover plate 5 to form integral units therewith. Each elongated holder sleeve 13 is constructed of a non-magnetic metal such as stainless steel and accommodates one or more magnet bars that are encased in a magnet bar assembly. The middle and lower portions of holder sleeves 13 are partially enclosed by screen cylinder 14.

As shown in FIGS. 2A and 2B, each magnet bar assembly 39 includes a non-magnetic tubular enclosure 10 that encases a magnet bar which consists of a plurality of short magnet blocks or cylinders 9 that are arranged in tandem with like poles positioned adjacent to each other. The blocks 9 are loaded into the sealed enclosure 10 which is then enclosed with guard plate 54 that has a pulling ring 11 attached to facilitate manual lifting. Holder sleeve 13, magnet block 9 and tubular enclosure 10 preferably have circular cross sections. As further shown in FIGS. 2C and 2D, when the magnet bar assemblies are inserted, into the holder sleeves 13, the length of each magnet bar 8 extends from cover plate 5 to the lower end of holder sleeve 13. Contaminants containing magnetic material are attracted by the magnetic field produced by the magnet bars 8; the contaminants adhere onto the entire exterior surface of elongated holder sleeve 13, which is completely sealed from interior 30 so there is no leakage of process fluid into holder sleeves 13.

FIGS. 3A and 3B illustrate that screen cylinder 14 is preferably constructed of two concentric vertically arranged layers of non-magnetic metal screens 17 and 18. The inner, finer screen 17 typically has a mesh size of 1 to 200 and preferably 10-100 wires per inch. The outer, coarser screen 18 typically has a mesh size of 10-100 and preferably 10-50 wires per inch. The top end of each screen 17, 18 is attached to rim 16, which is equipped with a pair of handles 15, and the lower side of each screen is attached to the upper perimeter 23 of the non-filtering section 34, which is preferably configured as a cone with tube 29 at the apex. During the filtration cycle, should contaminants become separated from holder sleeves 13 or screens 17, 18, the debris falls into and is collected in the funnel-shaped cone. The size of opening 56 in tube 29 must be large enough to accommodate the large particles that accumulate in the filtration process so that contaminates can be readily flushed out during cleaning.

In operation, as shown in FIG. 1, contaminated process stream 2 entering inlet 38 initially flows into plenum or chamber 42 where the process fluid expands and flows towards baffle 52. The configurations and positions of holder sleeves 13 and baffles evenly distribute the flow of contaminated fluid initially downward into screen cylinder 14. In this regard, the distance or gap between cover plate 5 and rim 16 should be optimized to allow the contaminated fluid to come into contact with as much of the holder sleeves as possible to maximize collection of magnetic contaminants. The strong magnetic fields developed by the plurality of the magnet bars in the holder sleeves 13 cause magnetic contaminants to deposit onto the outer surface of the holder sleeves 13. Subsequently, as the process fluid passes through inner and outer screens 17, 18 (FIG. 3B) large particles, including both magnetic and non-magnetic contaminants, are removed from the liquid the screens. Treated process fluid which is substantially free of the contaminants is channeled towards plenum or chamber 44 and exits the magnetic filter through outlet 40. The magnetic filter is structured as a two-stage filtration wherein the strength and numbers of magnet bars are sufficient to initially attract a desired amount of magnetic contaminants from the contaminated liquid process stream and then filter screen captures magnetic and non-magnetic contaminants of the desired size from the contaminated liquid, process stream.

Flow thorough inlet 38 and outlet 40 slows dramatically as the outer surfaces of holder sleeves 13 become layered with magnetic contaminants and screen cylinder 14 gets clogged with non-magnetic contaminants. Servicing the magnetic filter entails terminating the flow of contaminated process stream into the magnetic filter and then withdrawing magnet bars 8 from holder sleeves 13. This releases major portions of the magnetic contaminants that have been deposited on the outer surface of holder sleeves 13 which fall into the cone of the non-filtering section 34 of screen cylinder 14. A flush fluid, which is can be the cleaned process fluid, is introduced in a reverse direction through outlet 40. The flush fluid passes through inner and outer screens 17, 18 and dislodges non-magnetic contaminants therefrom and washes off residual magnetic contaminants from the outer surface of holder sleeves 13. The flush fluid, with entrained magnetic and non-magnetic contaminants, is discharged through the drain 7. Once magnetic bars 8 are slidably reinserted into holder sleeves 13 and drain valve 68 is shut, the cleaned magnetic filter ready to be reconnected online.

Figures 4A, 4B:
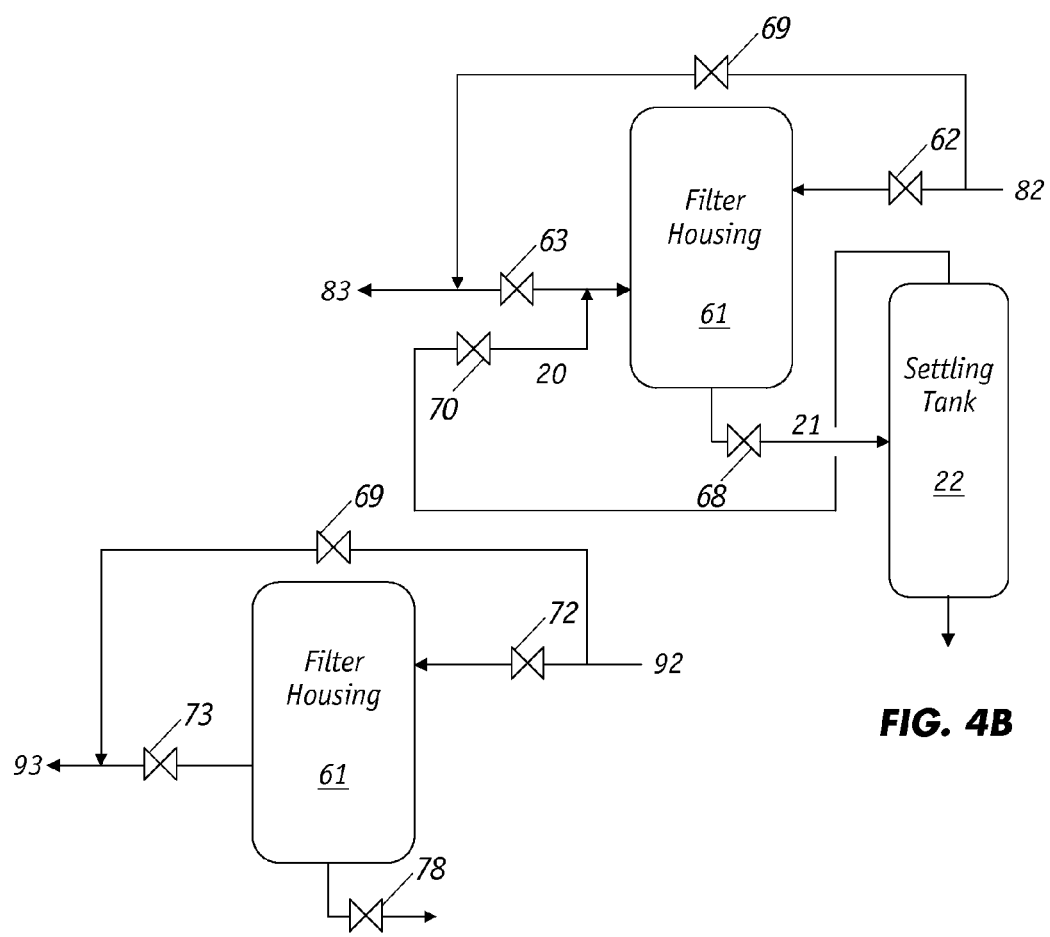
FIG. 4A depicts an operating cycle for the magnetic filter.
FIG. 4B depicts a maintenance cycle for the magnetic filter.

A schematic diagram illustrating the filtering and cleaning operations with a magnetic filter is depicted in FIG. 4A. During the filtration process, contaminated process fluid 92 flows through valve 72 and into magnetic filter housing 61 where contaminants are removed to yield a treated process fluid 93 that exits through valve 73. To service the filter housing 61 that is loaded with contaminants, after closing valve 72 and opening valves 69 and 78, a flush fluid is delivered through the outlet of filtering housing 61 through valve 73. The flush fluid laden with contaminants including sludge is discharged through valve 78.

FIG. 4B illustrates an arrangement in which a settling tank 22 is employed to supply recycled treated flush fluid to a magnetic filter. When filter housing, 61 becomes loaded with contaminants as evidenced by higher levels of contaminants present in the exiting treated process liquid and/or by an increased in the pressure drop across filter housing 61, valve 62 is shut to block the flow of contaminated process fluid 82. Valve 63 that regulates the flow of treated process liquid 83 from the magnetic filter is also shut while a filter by-pass valve 69 is opened to maintain continuous process operations. After magnetic bars are removed from the holder sleeves as described above, flush fluid is introduced in a reverse direction into the housing outlet via valve 70 through line 20. The flush fluid removes the magnetic and non-magnetic contaminants from the screen cylinder, in the manner which is described previously, and the flush fluid along with the contaminants are discharged through the bottom of filter housing 61 through valve 68. The mixture of flush fluid and sludge is transferred to a settling tank 22 via line 21. Decanted flush fluid is recycled from the top of settling tank 22 to filter housing 61 for repeated flush services; sludge is removed from the bottom of settling tank 22. After the filter is cleaned, the magnetic bars are then replaced into the filter housing and operating cycle is started again. The cleaning sequence illustrated in FIG. 4B can be readily implemented with process controls that automatically initiate cleaning when high contaminant concentrations in the treated process liquid are detected and/or the pressure drop exceeds a predetermined level.

The inventive magnetic filter is particular suited for treating process streams containing large amounts of magnetic particles as well as polymeric sludge occluded with such particles. The magnetic particles can include both ferromagnetic and paramagnetic materials and substances. Carbon steel, a common material for plant construction, tends to corrode in the presence of acidic contaminants in process streams especially in refineries and chemical plants. The corrosion forms ferrous ions in the stream, which react with sulfur, oxygen and water to form FeS, FeO, Fe(OH)$_2$, Fe(CN)$_6$, and other paramagnetic compounds that take the form of fine particles and visible flakes. These paramagnetic materials tend to attract degradation sludge, thereby transforming a major portion of the contaminants paramagnetic. By employing a magnetic filter, a substantially large portion of the contaminants, including polymeric sludge that has magnetic particles incorporated therein, can be effectively removed from the process stream. Only a small portion of the contaminants remain non-magnetic (or weak-magnetic) and do not respond to the magnetic field generated by the magnet. However, given that the quantity of non-magnetic contaminants is relatively small, most of the non-magnetic contaminants are subsequently captured by the screen(s) of the screen cylinder.

What is claimed is:

1. A magnetic filter for separating magnetic and non-magnetic contaminants from a contaminated liquid process stream that comprises:
   a housing having (i) an upper opening that is sealed with a detachable cover plate (ii) a process stream inlet (iii) a process stream outlet (iv) an interior region between the inlet and outlet and (v) a lower end, wherein the cover plate supports a plurality of vertically oriented, elongated non-magnetic holder sleeves with each holder sleeve being configured to accommodate one or more magnets that are disposed therein; and
   a screen cylinder that is positioned in the interior region wherein the screen cylinder has (i) a rim defining an opening through which the plurality of holder sleeves are disposed and (ii) a filter screen that encloses lower portions of the plurality of holder sleeves wherein the filter screen is configured to capture contaminants thereon wherein the rim and cover plate define a flow channel that directs the contaminated liquid process stream from the inlet through the opening of the rim, pass the holder sleeves so that magnetic contaminants adhere to the exterior of the holder sleeves and through the filter screen where non-magnetic contaminants of the desired size are removed to form a treated process stream that leaves via the outlet and wherein the one or more magnets that are disposed in each holder sleeve can be removed, from the holder sleeve without having to open the cover plate and exposing, the interior region to the environment.

2. The magnetic filter of claim 1 wherein the one or more magnets in each holder sleeve are encased in a non-magnetic tubular enclosure that is slidably received within the holder sleeve.

3. The magnetic filter of claim 1 wherein each holder sleeve is an integral part of the cover plate.

4. The magnetic filter of claim 1 wherein the contaminated liquid process stream flows in a substantially axial direction parallel to the plurality of elongated non-magnetic holder sleeves.

5. The magnetic filter of claim 1 wherein the screen cylinder comprises an upper vertical filtering portion made from a metal screen and a lower non-filtering base.

6. The magnetic filter of claim 5 wherein the housing comprises a drain at the lower end and the lower non-filtering base of the screen cylinder is in fluid communication with the drain.

7. The magnetic filter of claim 6 wherein the housing comprises an interior wall that has a support member engaging the rim of the screen cylinder and the lower non-filtering base is cone shaped with a tube at its apex that is coupled to the drain.

8. The magnetic filter of claim 7 wherein the drain has a threaded pipe and the tube is screwed onto the pipe.

9. The magnetic filter of claim 5 wherein the filtering portion comprises an inner finer screen with a mesh size 1 to 200 per inch and an outer coarser screen with a mesh size of 10 to 100 per inch wherein both screens are being made of non-magnetic metal.

10. The magnetic filter of claim 9 wherein the finer screen has a mesh size of 10 to 100 per inch and the coarser screen has a mesh size of 10 to 50 per inch.

11. The magnetic filter of claim 1 configured as a two-stage filtration apparatus wherein the number of holder sleeves employed is sufficient to attract a desired amount of magnetic contaminants from the contaminated liquid process stream and the filter screen captures magnetic and non-magnetic contaminants of the desired size from the contaminated liquid process stream.

12. The magnetic filter of claim 1 wherein the filter screen comprises a plurality of mesh screens arranged concentrically with each screen having pores that capture certain sized magnetic and non-magnetic contaminants.

13. The magnetic filter of claim 1 wherein the plurality of holder sleeves form an array of holder sleeves that are spaced part to form a plurality of evenly distributed channels through which the contaminated liquid process stream flows.

14. The magnetic filter of claim 1 comprising one or more baffles that direct the contaminated liquid process stream from the process stream inlet toward the opening of the rim.

15. A method of removing magnetic and non-magnetic particles from a contaminated liquid process stream that comprises the steps of:

(a) providing a magnetic filter device that comprises:
- a housing having (i) an upper opening that is sealed with a detachable cover plate (ii) a process stream inlet (iii) a process stream outlet (iv) an interior region between the inlet and outlet and (v) a lower end, wherein the cover plate supports a plurality of vertically oriented, elongated non-magnetic holder sleeves with each holder sleeve being configured to accommodate one or more magnets that are disposed therein; and
- a screen cylinder that is positioned in the interior region wherein the screen cylinder has (i) a rim defining an opening through which the plurality of holder sleeves are placed and (ii) a filter screen that encloses lower portions of the plurality of holder sleeves wherein the filter screen is configured to capture contaminants thereon wherein the rim and cover plate define a flow channel that directs the contaminated liquid process stream from the inlet through the opening of the screen cylinder, pass the holder sleeves and through the filter screen;

(b) connecting the contaminated liquid process stream to the inlet of the magnetic filter such that as the contaminated liquid process stream initially flows pass the holder sleeves, magnetic contaminants adhere to the exterior of the holder sleeves and subsequently as the contaminated liquid process stream continues pass the filter screen non-magnetic contaminants of the desired size are removed by the filter screen to thereby form a treated process stream that exits through the outlet;

(c) terminating the flow of the contaminated liquid process stream, into the inlet;

(d) withdrawing magnets from one or more of the holder sleeves, without having to open the cover plate and expose the interior region to the environment, to thereby release magnetic contaminants that have adhered to the exterior surface of the holder sleeves;

(e) flushing out magnetic and non-magnetic contaminants from the screen cylinder; and (f) placing magnets back into one or more holder sleeves.

16. The method of claim 15 wherein step (e) comprises introducing a flush fluid in reversed direction such that the flush fluid initially flows through the filter screen before contacting the exterior surface of the holder sleeves to flush out contaminants through a drain that is connected to the lower end of the screen cylinder.

17. The method of claim 15 wherein flush fluid containing flushed out contaminants is transferred to a settling tank where and decanted flush fluid is recycled for repeated backwashing.

18. The method of claim 15 wherein the flush fluid comprises treated process fluid.

19. The method of claim 15 wherein withdrawing one or more magnets from a holder sleeve releases the contaminants that had adhered onto the exterior surface the holder sleeve.

20. The method of claim 15 wherein the screen cylinder comprises an upper vertical filtering portion made from a metal screen and a lower non-filtering base and wherein magnetic and non-magnetic contaminant particles are collected in the lower non-filtering base during the treatment process of step (b).

* * * * *